United States Patent [19]

Graichen

[11] Patent Number: 5,540,053
[45] Date of Patent: Jul. 30, 1996

[54] ACTUATING UNIT FOR A HYDRAULIC BRAKE SYSTEM FOR AUTOMOTIVE VEHICLES

[75] Inventor: Kai-Michael Graichen, Langen, Germany

[73] Assignee: ITT Automotive Europe GmbH, Germany

[21] Appl. No.: 356,185

[22] PCT Filed: Jun. 19, 1992

[86] PCT No.: PCT/EP93/00845

§ 371 Date: Dec. 19, 1994

§ 102(e) Date: Dec. 19, 1994

[87] PCT Pub. No.: WO94/00324

PCT Pub. Date: Jan. 6, 1994

[30] Foreign Application Priority Data

Apr. 19, 1992 [DE] Germany ............ 42 20 076.8

[51] Int. Cl.⁶ ...................................... B60T 13/20
[52] U.S. Cl. .................. 60/552; 92/107; 92/169.4
[58] Field of Search .............. 60/552, 554; 92/107, 92/169.3, 169.4

[56] References Cited

U.S. PATENT DOCUMENTS

| 3,040,535 | 6/1962 | Randol | 60/554 |
| 4,307,570 | 12/1981 | Yardley | 92/107 |
| 4,418,611 | 12/1983 | Tateoka et al. | 92/169.3 |

FOREIGN PATENT DOCUMENTS

| 2922299 | 6/1979 | Germany . |
| 2044375 | 3/1979 | United Kingdom . |

Primary Examiner—F. Daniel Lopez
Attorney, Agent, or Firm—Dykema Gossett PLLC

[57] ABSTRACT

An actuating unit for a hydraulic brake system for automotive vehicles includes a vacuum brake power booster and a master brake cylinder. To transmit the reaction forces, developing during actuation in the master brake cylinder, to a vehicle body wall which carries the actuating unit, a centrally positioned force-transmitting element is provided, which is arranged between the master brake cylinder and the vehicle body wall in terms of effect. The force-transmitting element is formed of a continuous bolt which extends in an axial direction through the control housing of the vacuum brake power booster.

17 Claims, 3 Drawing Sheets

5,540,053

ACTUATING UNIT FOR A HYDRAULIC BRAKE SYSTEM FOR AUTOMOTIVE VEHICLES

BACKGROUND OF THE INVENTION

The present invention relates to an actuating unit for a hydraulic brake system for automotive vehicles, including a pneumatic brake power booster, which is preferably a vacuum brake power booster, and a master brake cylinder inserted after the brake power booster in terms of effect. The brake power booster includes a booster housing, the interior of which is subdivided into two chambers by a movable wall which is attached to a control housing accommodating a control valve, and a centrally arranged force-transmitting element being provided which is in force-transmitting connection with the master brake cylinder, on the one hand, and a vehicle body wall of the automotive vehicle, on the other hand.

An actuating unit of this type is disclosed in German patent DE 29 22 299. The force-transmitting element of the brake power booster of the prior-art actuating unit is provided as a carrying pipe with axial slots, through which the movable wall is coupled with a part of the control housing which is arranged inside the carrying pipe and actuates an output member transmitting the output force of the brake power booster.

What is considered least favorable in the referenced actuating unit is the complicated and costly way of transmitting forces from the movable wall to the output member, which is done by means of tabs provided on the movealble wall to the above-mentioned control housing part, in which the output member is held by way of a retaining ring screwed to the movable wall. For this reason, a tandem-type design would be possible only by very great structural efforts.

Another disadvantage is the considerable overall axial length and the comparatively high weight of the referenced actuating unit. The high weight is mainly due to the massive carrying pipe, made of metal, and the diaphragm plate, forming the movable walls which must be made of a thick material in order to transmit major boosting forces.

Finally, still another disadvantage is that the configuration of the carrying pipe depends on customer requests for flange patterns or vehicle-related flange patterns to mount the master brake cylinder to the booster housing and to mount the brake power booster to the vehicle body wall. Different carrying pipes are required for different combinations of flange patterns.

Therefore, an object of the present invention is to provide an actuating unit of the previously mentioned type with a design which permits reducing costs and weight. In addition, both the booster housing and the diaphragm plate should be made of an extremely thin sheet metal. Further, the application of control assemblies, which nowadays are typically rated for a plurality of booster sizes, with almost all component parts and in particular those requiring tools should be ensured without structural modifications. Still further, the invention is to provide a simple and inexpensive tandem-type design.

This object is achieved according to the present invention in that the force-transmitting element is a continuous bolt which extends in an axial direction through the control housing.

As in the past, the vacuum forces acting on the booster housing half closest to the vehicle body wall and the forces which are developed by a possible pulling of the actuating pedal or by an abrupt resetting movement of the brake pedal, are introduced into the vehicle body wall. All the other occurring forces are absorbed and transmitted by the central bolt under pressure and tension which does not depend on the desired flange pattern.

Due to a favorable improvement provided by the present invention, the operating safety is increased by means of the valve piston having a sleeve-shaped design. The sleeve-shaped valve piston is guided on the bolt and, with its end, supported at the actuating pedal. The preferred embodiment provides a large guide length for the valve piston so that the buckling risk is eliminated as far as possible.

Another embodiment of the present invention, in which the brake power booster includes an elastic reaction disc which is arranged in the control housing and permits transmitting the output force of the brake power booster to the piston by means of a pressure plate being in force-transmitting connection with a piston guided in the master brake cylinder, includes a reaction disc and pressure plate that have an annular design and are positioned coaxially relative to the bolt on a sleeve, which is slidably guided on the bolt. This reduces the response/resetting force hysteresis.

In another embodiment of the present invention, which can be produced in a particularly cost-efficient way, the output force is transmitted to the piston by means of at least two rod-shaped elements which are arranged symmetrically in parallel to the bolt between the piston and the pressure plate.

An improvement of the piston guide is achieved, according to another embodiment of the present invention, in that the output force is transmitted to the piston by means of a bolt-shaped element which is guided in a hollow-cylindrical section of the bolt having radially opposed slots, and which is in axial abutment against a pin positioned perpendicularly in the pressure plate. The bolt-shaped part can preferably be formed by an axial extension of the piston.

In still another embodiment of the present invention, the end of the bolt which is associated with the master brake cylinder is connected to a closure element closing the master brake cylinder towards the outside. This allows a direct transmission of the reaction forces from the master brake cylinder to the vehicle body wall, without an additional deviation.

In the preferred embodiment of the present invention, the pneumatic forces, acting on the booster housing half closest to the master brake cylinder and depending on the vacuum, are directly transmitted to the vehicle body wall by connecting the end of the bolt associated with the master brake cylinder to a bowl-shaped part which receives the end of the master brake cylinder housing projecting into the booster housing and is connected to the booster housing half closest to the master cylinder.

The bowl-shaped part preferably has a radial collar which serves to fasten the part to the booster housing and as an abutment for a resetting spring biasing the movable wall in opposition to the actuating direction, so that a good guide of the resetting spring is ensured. A cost-effective simplification of the construction is provided by the bowl-shaped part being formed in one part with the booster housing half closest to the master cylinder.

In a further embodiment of the present invention, the torsional stiffness of the actuating pedal is increased by the actuating pedal being of fork-shaped design and including two parallel arms spaced from each other, the bolt extending between the arms. By this means it is possible to realize a solid actuating pedal without excess weight in comparison with conventional brake pedals.

The mounting of the actuating unit according to the present invention is considerably simplified because the actuating pedal is pivotally supported at a pedal assembly mounted on the booster housing, in which the fastening means associated with the vehicle body wall is provided at the periphery of the booster housing. This allows furnishing complete assemblies which can be mounted into automotive vehicles by the automotive vehicle manufacturers without causing additional costs.

A further embodiment of the present invention provides an optimal utilization of the mounting space available in the automotive vehicle in that the actuating unit, in the mounted condition on the vehicle body wall, is clamped in between the booster housing and the pedal assembly.

Furthermore it is particularly preferable, when the end of the bolt remote from the master brake cylinder is anchored at the pedal assembly. This is a simple way of transmitting all the forces to the vehicle body wall through the bolt.

A shortening of the empty run occurring during actuation, which is important for the function, is achieved by providing a transverse member which defines the inactive position of the valve piston and is in axial abutment against a ring seal sealing the booster housing towards the outside.

Further details, characteristics and advantages of the present invention will become apparent to those skilled in the art from the subsequent description of the preferred embodiment.

DETAILED DESCRIPTION OF THE PREFERRED EMBODIMENTS

Figure 1:
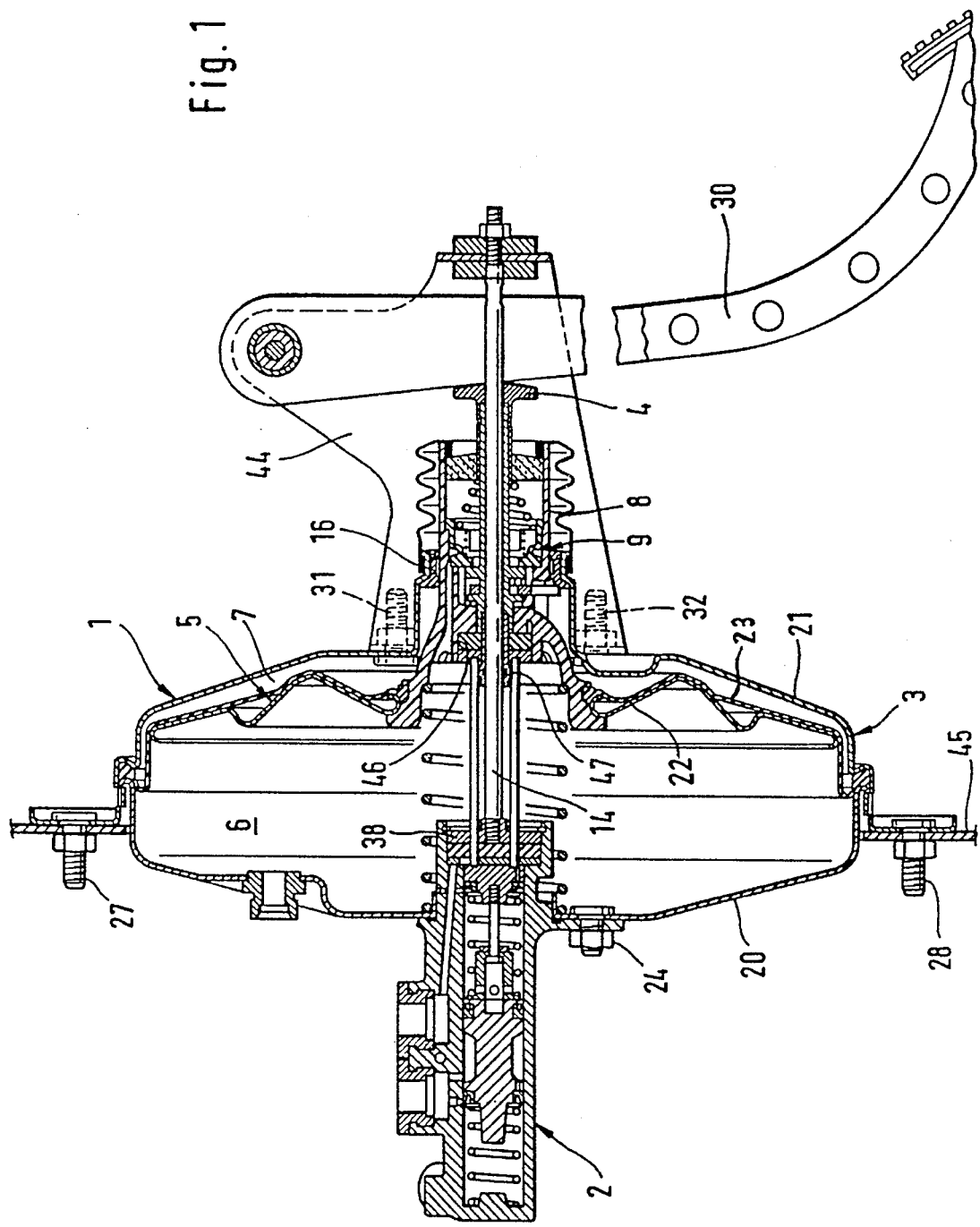
FIG. 1 illustrates a first embodiment of the actuating unit according to the present invention, in axial section.

The actuating unit according to the present invention, as shown in FIG. 1, includes a vacuum brake power booster 1 and a master brake cylinder 2, which is preferably a tandem-type master cylinder, inserted after the vacuum brake power booster. The vacuum brake power booster 1 includes a booster housing 3, formed by two housing halfs 20,21 connected to each other, in which the housing half 20, represented on the left side, supports the tandem-type master cylinder 2, while the housing half 21, represented on the right side, is fastened to a vehicle body wall 45 of an automotive vehicle with fastening means 27,28 provided at its periphery.

In a cylindrically-formed extension of the right housing half 21, which is not shown in detail, a control housing 8, including a control valve 9 which can be actuated by an input member 4 being in axial abutment against an actuating pedal 30, is slidably guided in a sliding ring seal 16. On the end remote from the input member 4 the control housing 8 supports a movable wall 5 which is formed by a diaphragm plate 22 and a rolling diaphragm 23 being in abutment against it. Moveable wall 5 subdivides the interior of the brake power booster housing 3 into an evacuable vacuum chamber 6 and a working chamber 7. Control valve 9 permits a connection between the working chamber 7 and the vacuum chamber 6 or the atmosphere. As can be seen (especially from FIG. 3) the control valve 9 is preferably formed by two sealing seats 10,11 which have an annular design, are arranged coaxially to each other and interact with an elastic, rotationally symmetrical valve body 12. Valve body 12 can be a disc valve, for example. Sealing seats 10, 11 are in abutment against valve body 12 when the vacuum brake power booster 1 is in a release position.

The first sealing seat 10, the opening of which allows a connection between the two chambers 6,7, is provided in the control housing 8. The second sealing seat 11, the opening of which allows a ventilation of the working chamber 7, is provided on a valve piston 15. Valve piston 15 is guided on a continuous and centrally positioned force-transmitting bolt 14 and is in force-transmitting connection with the input member 4. Valve piston 15 has a resetting movement which is limited by a transverse member 17 being, in a release position, in axial abutment against a sliding ring seal. The sleeve-shaped valve piston 15 is in force-transmitting connection with an elastic reaction disc 13, which preferably has an annular design. Valve piston 15 is positioned in a cylindrical recess of the control housing 8 and allows the transmission of the actuating force introduced at the input member 4, on the one hand, and also of the boosting force generated by the movable wall 5 onto a pressure plate 26, on the other hand, which interacts with a master brake cylinder piston 29.

The force-transmitting bolt 14, which preferably extends axially through the control housing 8, is screwed in a closure element 38 with the end closest to the tandem-type master cylinder 2. Closure element 38 closes the tandem-type master cylinder 2 and is fastened to the left booster housing half 20 by means of fastening screws 24, towards the outside. The other end of the force-transmitting bolt 14 is anchored to the pedal assembly 44. Actuating pedal 30 is pivotally supported on pedal assembly 44. Pedal assembly 44 is fastened to the booster housing half 21 (illustrated on the right side of the drawing) by means of the mounting element 31,32, so that actuating pedal 30 causes a transmission of the reaction forces resulting from the pressure generated in the tandem-type master cylinder 2 directly from the master cylinder 2 to the vehicle body wall 45.

Figure 3:
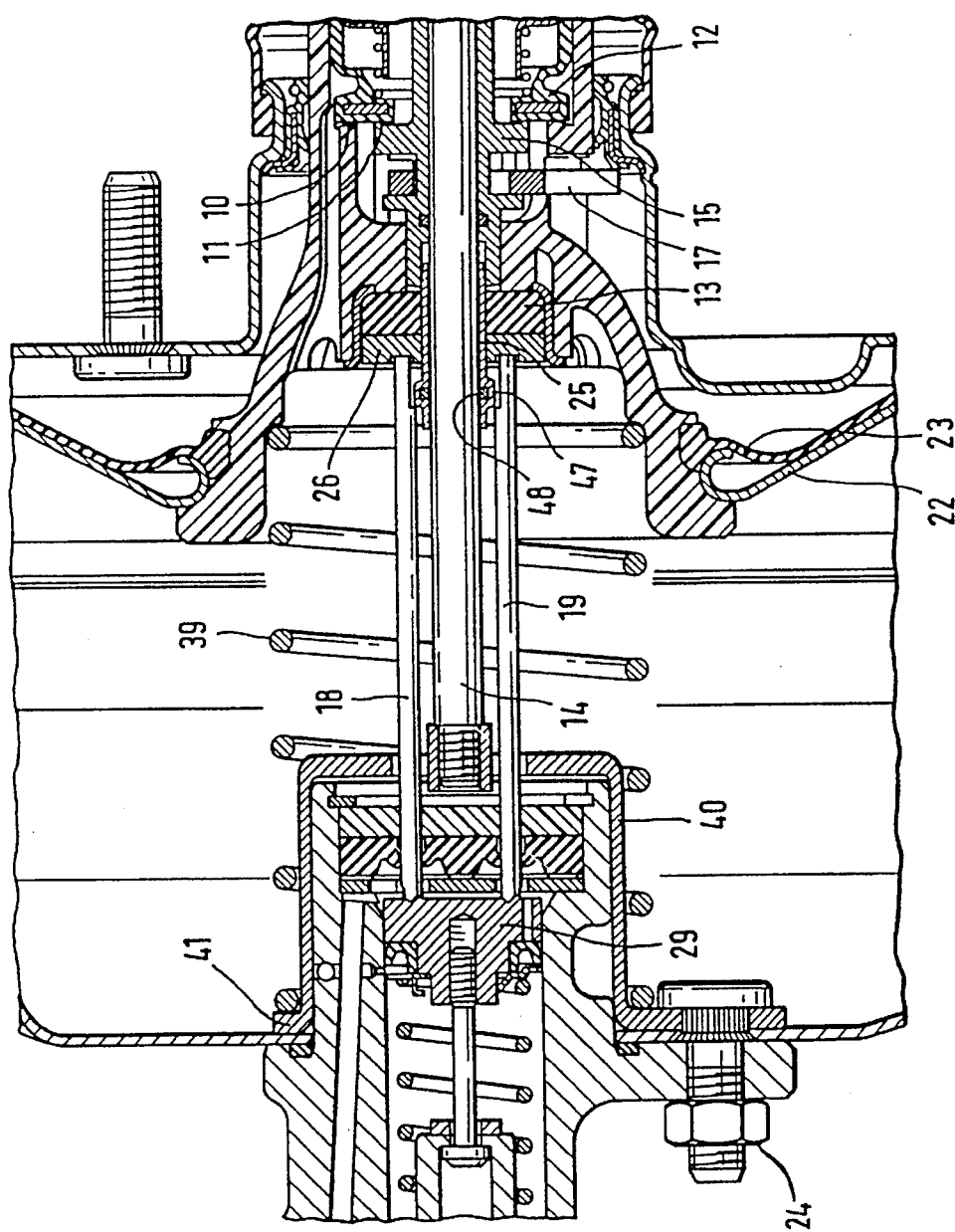
FIG. 3 is an illustration of selected portions of the slightly modified central part of the actuating unit according to the embodiment shown in FIG. 1, in bigger scale.
Figure 2:
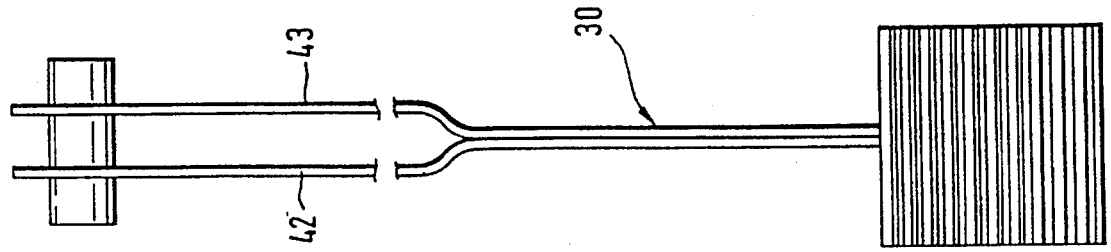
FIG. 2 illustrates an embodiment of the actuating pedal which can be used with the actuating unit according to the embodiment of the present invention, illustrated in FIG. 1.

Referring now to FIGS. 2 and 3, the force-transmitting bolt 14 extends through the range of action of the actuating pedal 30 between two parallel arms 42,43 of the actuating pedal 30 arms 42, 43 are spaced from each other, while the reaction disc 13 and the pressure plate 26 are arranged on a tubular sleeve 25, which is guided slidingly on the force-transmitting bolt 14 and receives a seal ring 48 in its radial enlarged portion 47. Certainly the actuating pedal can be designed in another way, as for example a pedal with an opening that receives the force-transmitting bolt 14 or a pedal with a flat arm interacting with a slotted force-transmitting bolt. In the embodiment of FIG. 3 the output force of the vacuum brake power booster 1 to the tandem-type master cylinder piston 29 is transmitted by two rod-shaped elements 18,19, which are arranged symmetrically in parallel to the force-transmitting bolt 14 between the tandem-type master cylinder piston 29 and the pressure plate 26.

In the embodiment of the present invention illustrated in FIG. 3, the end of the force-transmitting bolt 14 closest to the master cylinder 2 is screwed in a bowl-shaped part 40, which is screwed to the booster housing half 20 by means of the fastening screws 24, which fasten the master cylinder 2 to the booster housing half 20. To this end the bowl-shaped part 40 is provided with a radial collar 41 which serves as an abutment for a resetting spring 39 biasing the movable wall 5 in opposition to the actuating direction. Alternatively, force-transmitting bolt 14 and the part 40 can be connected also in other ways, as, for example, a connection by way of indentation, a bayonet connection and the like. A one-piece version of the bowl-shaped part 40 with the booster housing half 20 closest to the master cylinder is also possible.

Figure 4:
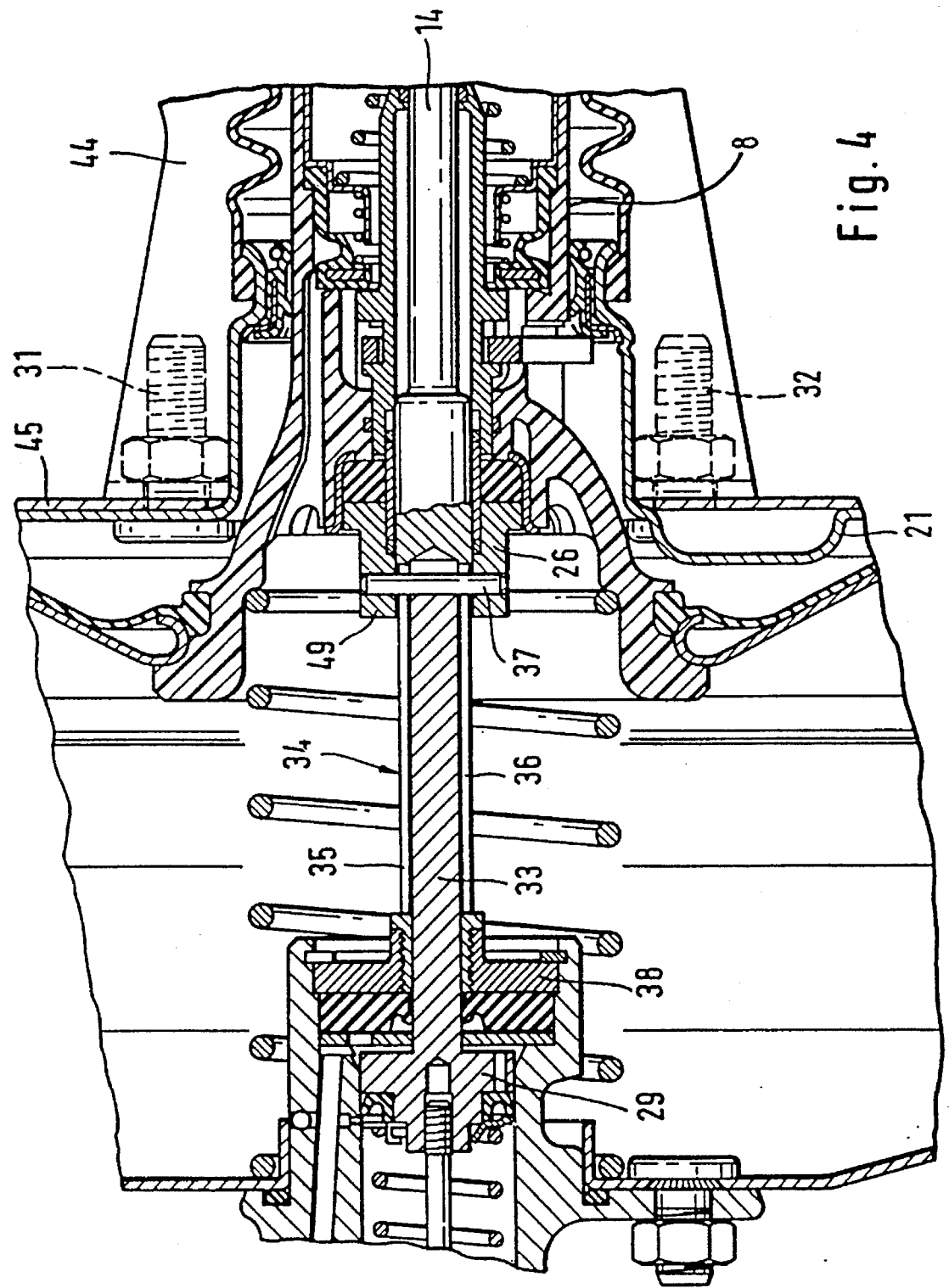
FIG. 4 illustrates a third embodiment of the actuating unit, according to the present invention, in an illustration corresponding to FIG. 3.

In the embodiment of the present invention that is illustrated in FIG. 4, the actuating unit 1,2 is fastened to the vehicle body wall 45 by means of the mounting elements 31,32, which retain the pedal assembly 44. The vehicle body wall 45 is clamped in between the right booster housing half 21 and the pedal assembly 44. The force-transmitting bolt 14 has a hollow-cylindrical section 34 which protrudes from the control housing 8 and provides, in the illustrated section, two radially opposed axial slots 35,36. This embodiment provides that the output force of the vacuum brake power booster 1 is transmitted to the tandem-type master cylinder piston 29 by means of a bolt-shaped element 33 which is formed, in the illustrated example, by an axial extension of the master cylinder piston 29. The part 33, which is guided in the section 34 of the force-transmitting bolt 14, is in axial abutment against a transverse pin 37 guided in the slots 35,36 and positioned perpendicularly in a cylindrical projection 49 of the pressure plate 26, so that the two parts 33,37 are in a force-transmitting connection. Experts working in the relevant field are familiar with the function of the actuating unit 1,2 according to this invention which therefore does not have to be discussed in detail.

The preceding description is exemplary rather than limiting in nature. The purview and scope of this invention is to be limited only by the appended claims.

I claim:

1. An actuating unit for a hydraulic brake system for automotive vehicles comprising:

a pneumatic brake power booster;

a master brake cylinder having a housing inserted after said brake power booster in terms of effect, said brake power booster including a booster housing, the interior of which is subdivided into two chambers by a movable wall which is attached to a control housing accommodating a control valve; and a centrally arranged force-transmitting element which is in force-transmitting connection with said master brake cylinder, on the one hand, and a vehicle body wall of the automotive vehicle, on the other hand, said force-transmitting element being formed of a continuous bolt which extends in an axial direction through the control housing.

2. An actuating unit as claimed in claim 1, wherein said control valve of said brake power booster is operable by a valve piston which interacts with an actuating pedal, and wherein said valve piston has a sleeve-shaped design which is guided on said bolt and at one end, is supported at said actuating pedal.

3. An actuating unit as claimed in claim 2, wherein said brake power booster includes an elastic reaction disc which is arranged in said control housing and permits transmitting an output force of said brake power booster to said piston by a pressure plate that is in force-transmitting connection with a second piston guided in the master brake cylinder, said reaction disc and said pressure plate having an annular design and being positioned coaxially relative to said bolt on a sleeve which is slidably guided on said bolt.

4. An actuating unit as claimed in claim 3, wherein said output force is transmitted to said second piston by at least two rod-shaped elements which are arranged symmetrically in parallel to said bolt between said second piston and said pressure plate.

5. An actuating unit as claimed in claim 3, wherein said output force is transmitted to said second piston by a bolt-shaped element, which is guided in a hollow-cylindrical section of said bolt having radially opposed slots, and which is in axial abutment against a pin positioned perpendicularly in said pressure plate.

6. An actuating unit as claimed in claim 1, wherein one end of said bolt, which is associated with said master brake cylinder, is connected with a closure element closing said master brake cylinder.

7. An actuating unit as claimed in claim 1, wherein one end of said bolt associated with said master brake cylinder is connected to a bowl-shaped part, one end of said master brake cylinder housing projecting into said booster housing and being connected to a booster housing half proximate said master cylinder.

8. An actuating unit as claimed in claim 7, wherein said bowl-shaped part has a radial collar which serves to fasten said part to said booster housing, said radial collar providing an abutment for a resetting spring for biasing said movable wall in opposition to an actuating direction.

9. An actuating unit as claimed in claim 7, wherein said bowl-shaped part is formed in one part with said booster housing half proximate said master cylinder.

10. An actuating unit as claimed in claim 1, further comprising an actuating pedal that is fork-shaped and includes two parallel arms spaced from each other, said bolt extending between said arms.

11. An actuating unit as claimed in claim 10, wherein said actuating pedal is pivotally supported at a pedal assembly mounted on said booster housing.

12. An actuating unit as claimed in claim 11, further comprising a fastening means associated with a vehicle body wall provided at a periphery of said booster housing.

13. An actuating unit as claimed in claim 11, wherein an end of said bolt remote from said master brake cylinder is anchored at said pedal assembly.

14. An actuating unit as claimed in claim 1, further comprising a transverse member that defines an inactive position of said valve piston and is in axial abutment against a ring seal sealing said booster housing towards an outside of said booster housing.

15. An actuating unit for a vehicle brake system, comprising:

a vacuum brake power booster having a booster housing that includes two housing halves, at least one of said booster housing halves being coupled to a vehicle body wall;

a master brake cylinder coupled to one of said booster housing halves;

a moveable wall disposed within said booster housing for dividing said booster housing into two chambers, said moveable wall being attached to a control housing, said control housing accommodating a control valve; and a bolt directly coupled to a portion of said master cylinder at a first bolt end and effectively coupled to said vehicle body wall at a second bolt end, said bolt being disposed within said booster housing and serving to transmit forces developed in said master cylinder during brake actuation to said vehicle body wall, further including an actuating pedal for actuating the brake system, and a valve piston for actuating said control valve, said pedal being coupled to said valve piston proximate a first pedal end, said first pedal end having two generally parallel fork arms that receive a portion of said bolt between said arms.

16. The actuating unit of claim 15, further comprising a bowl-shaped part connected to one of said booster housing halves, said bowl-shaped part having a radial collar for coupling said bowl-shaped part to said booster housing half, said radial collar further providing an abutment surface for a biasing means that biases said moveable wall in a direction opposing an actuation direction.

17. An actuating unit for a vehicle brake system, comprising:

a vacuum brake power booster having a booster housing that includes two housing halves, at least one of said booster housing halves being coupled to a vehicle body wall;

a master brake cylinder coupled to one of said booster housing halves;

a moveable wall disposed within said booster housing for dividing said booster housing into two chambers, said moveable wall being attached to a control housing, said control housing accommodating a control valve; and a bolt directly coupled to a portion of said master cylinder at a first bolt end and effectively coupled to said vehicle body wall at a second bolt end, said bolt being disposed within said booster housing and serving to transmit forces developed in said master cylinder during brake actuation to said vehicle body wall, further including an actuating pedal and wherein said control valve is operable by a valve piston having a sleeve-shaped design, said valve piston being guided on said bolt and being supported by said pedal at one end of said piston, said piston interacting with said pedal to operate said control valve.

* * * * *